United States Patent [19]
Sarauer

[11] Patent Number: 5,621,978
[45] Date of Patent: Apr. 22, 1997

[54] BAR FOR COORDINATE MEASURING MACHINE

[76] Inventor: Alan J. Sarauer, Rte. 6, Box 58, Chippewa Falls, Wis. 54729

[21] Appl. No.: 258,612

[22] Filed: Jun. 10, 1994

Related U.S. Application Data

[63] Continuation of Ser. No. 91,762, Jul. 14, 1993, abandoned.

[51] Int. Cl.⁶ .................................................. G01B 5/004
[52] U.S. Cl. ............................................ 33/503; 33/1 M
[58] Field of Search .................... 33/1 M, 503; 238/122; 105/29.1, 145; 104/118, 120

[56] References Cited

U.S. PATENT DOCUMENTS

| | | | |
|---|---|---|---|
| 2,685,260 | 8/1954 | Auger | 105/29.1 |
| 3,384,970 | 5/1968 | Avalear | 33/503 |
| 3,478,436 | 11/1969 | Barnes | 33/503 |
| 3,531,868 | 10/1970 | Stevenson | 33/503 |
| 3,774,311 | 11/1973 | Stemple | 33/1 M |
| 4,014,417 | 3/1977 | Kugler et al. | 238/122 |
| 4,366,624 | 1/1983 | Bergstrom | 33/600 |
| 4,442,607 | 4/1984 | Sakata et al. | 33/1 M |
| 4,466,190 | 8/1984 | Ross et al. | 33/503 |
| 4,490,918 | 1/1985 | Clausen | 33/288 |
| 4,683,663 | 8/1987 | Wendl et al. | 33/288 |
| 4,763,420 | 8/1988 | McCabe et al. | 33/503 |
| 4,833,630 | 5/1989 | Braman et al. | 33/504 |
| 5,042,162 | 8/1991 | Helms | 33/503 |

OTHER PUBLICATIONS

*Yellow Jacket* Axi–Scan Brochure. 1991, McPherson Manufacturing, Inc.

*Primary Examiner*—William A. Cuchlinski, Jr.
*Assistant Examiner*—G. Bradley Bennett
*Attorney, Agent, or Firm*—Ryan, Maki, Mann & Hohenfeldt

[57] ABSTRACT

A coordinate measuring machine having three elongated members defining X, Y and Z axes is provided wherein the Y axis is defined by a horizontal arm extendedly and retractably mounted in a housing supported on the rail defining the Z axis. The horizontal arm is provided with convex ridges on its upper and lower surfaces. The ridges preferably extend along the center line of the arm. The arm is supported by upper and lower pairs of wheels having concave surfaces located in the housing.

7 Claims, 2 Drawing Sheets

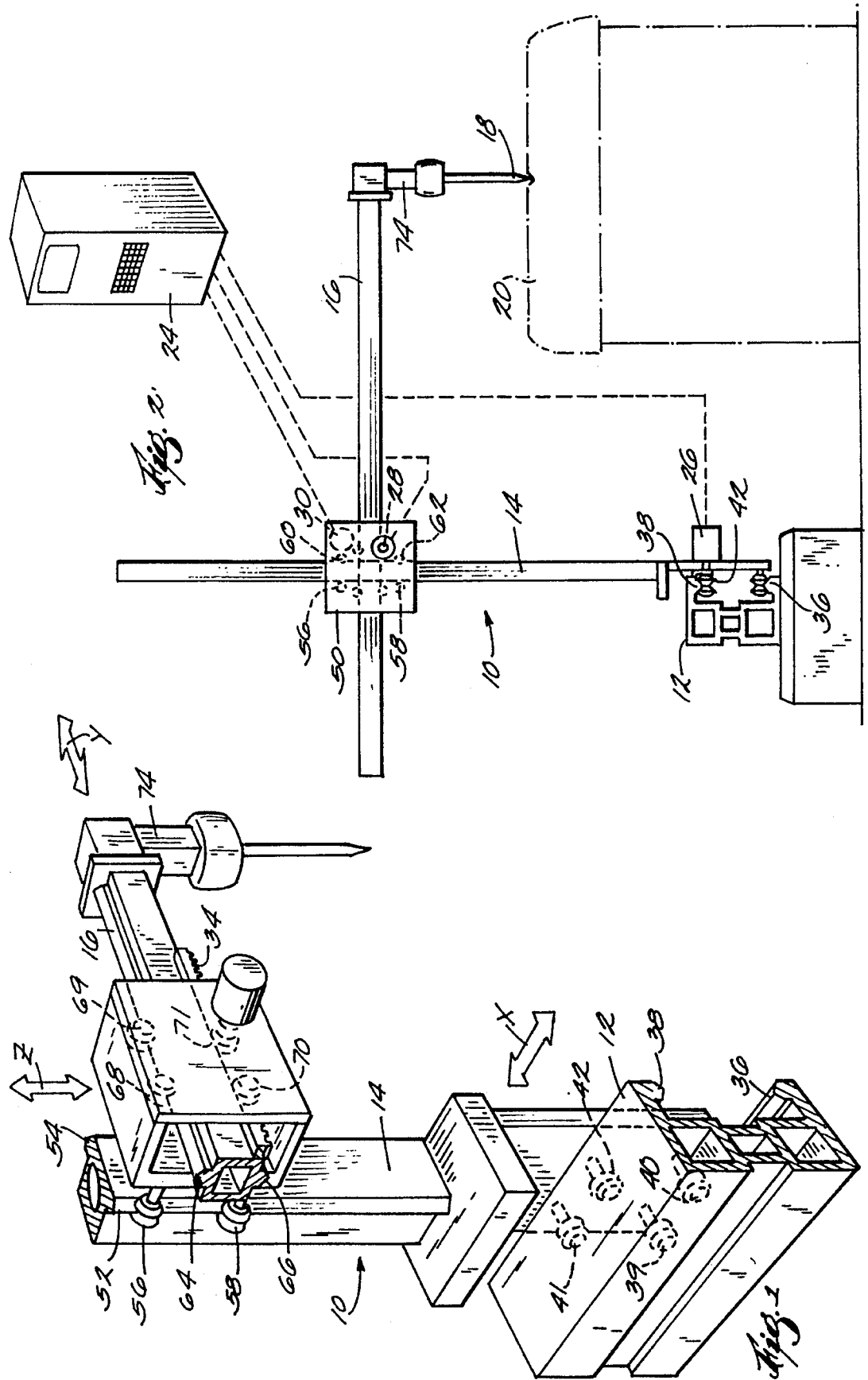

BAR FOR COORDINATE MEASURING MACHINE

This is a continuation of application Ser. No. 08/091,762 filed on Jul. 14, 1993, now abandoned.

FIELD OF THE INVENTION

This invention relates to coordinate measuring machines. More specifically, the invention relates to improved extendable arms for use in such machines.

BACKGROUND OF THE INVENTION

Coordinate measuring machines are used for dimensional inspections of work pieces such as models or machine parts. For example, such devices are useful in producing molds, dies and fixtures having a high degree of accuracy produced from blue prints or CAD/CAM data. Somewhat similar devices include machines used in the measurement of auto bodies during repair as described in my U.S. Pat. No. 4,683,663.

A need has continued to exist for devices that are accurate to perform measurements within close tolerances, yet which are inexpensive to manufacture.

SUMMARY OF THE INVENTION

In accordance with the present invention, an improved extendable-retractable arm for use in coordinate measuring machines is provided. In accordance with one aspect of the invention, such an arm is provided having particular applicability to measurement of a Y ordinate in a coordinate measuring machine. A related aspect relates to providing economical, yet accurate, extendable retractable arms for such uses. According to another related aspect, such an arm is provided which can be formed by extrusion and yet have supporting surfaces that are machined to close tolerances.

A still further aspect of the invention involves providing a measuring arm in which the surfaces used to support the arm also provide reinforcement to the arm so that it is dimensionally stable and particularly resistent to flexing.

Briefly summarized, the present invention provides a coordinate measuring machine having a horizontal rail that defines an X-axis. A vertical rail is movable along the horizontal rail and defines a Z-axis. A horizontal arm is orthogonally situated relative to the X and Z axes and is extendably and retractably supported in a support housing on the Z-axis. The support housing is mounted for upward and downward movement along the Z-axis. The arm defining the Y-axis is provided with convex V-shaped surfaces on its upper and lower sides. The convex V-shaped surfaces engage mating concave supporting surfaces in the housing which are preferably in the form of upper and lower pairs of wheels that rotatably support the horizontal arm.

Further objects and advantages of the invention will be apparent from the following detailed description and accompanying drawings wherein:

DRAWINGS

FIG. 1 is a perspective view with parts cut away and shown in cross-section of a coordinate measuring machine of the present invention;

FIG. 2 is a side elevational view of the coordinate measuring machine of FIG. 1 with attachment thereof to a microprocessor shown schematically;

DETAILED DESCRIPTION OF THE DRAWINGS

Figure 5:
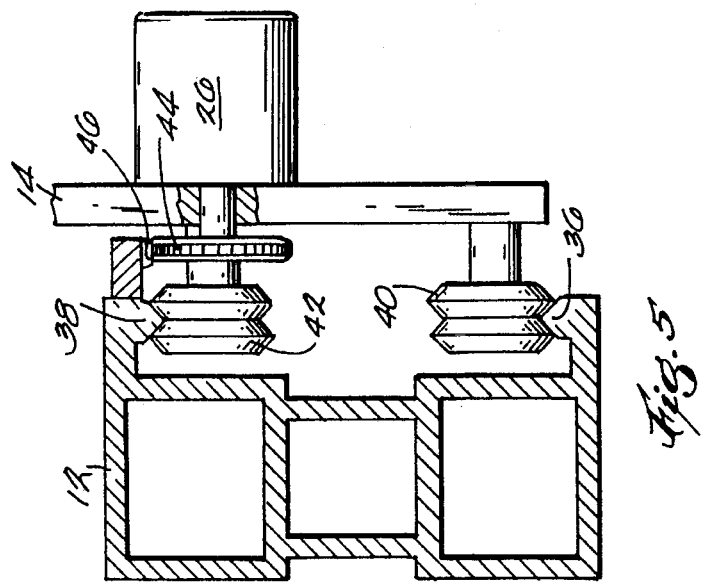
FIG. 5 is a sectional view of the horizontal supporting rail of the present invention.

Referring more specifically to the drawings, there is seen a coordinate measuring machine 10. As best seen in FIG. 1, a horizontal rail 12 is provided in order to permit movement in the X direction. A vertical rail 14 is provided in order to allow movement of the device in the Z direction. A horizontal rail 16 is orthogonally oriented relative to rails 12 and 14 is provided for movement of the device in the Y direction. A pointer 18 is preferably positioned on the distal end of rail 16 in order to locate a point on a workpiece 20.

Figure 4:
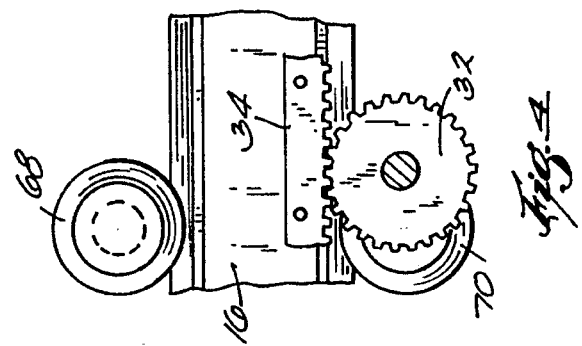
FIG. 4 is a fragmentary side cross-sectional view taken along line 4—4 of FIG. 3.
Figure 3:
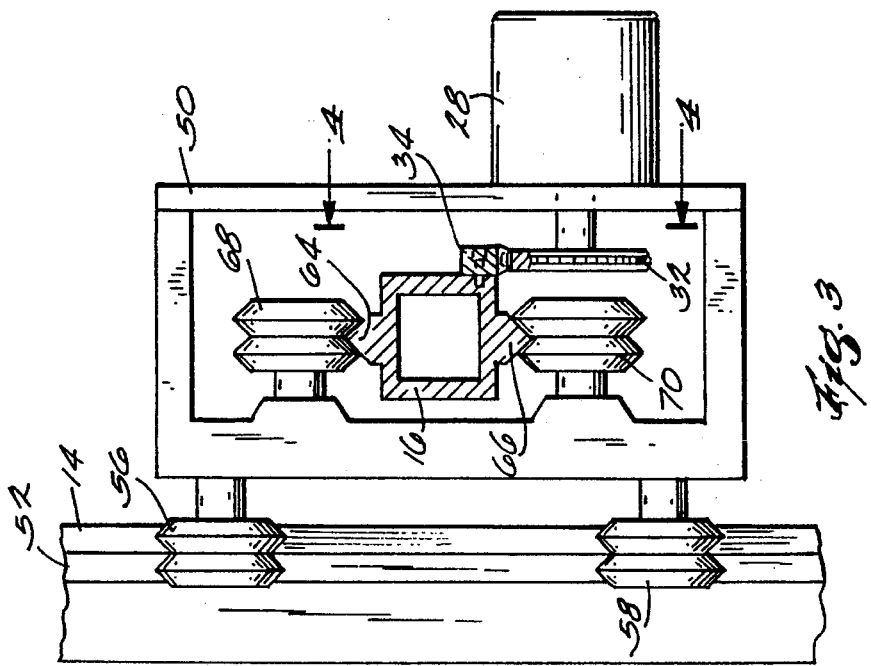
FIG. 3 is elevational view showing an ordinate measuring arm of the machine endwise.

The position of each of arms 14 and 16 relative to a starting point can be indicated by means of linear position markings along each of the arms, if desired. They can also be indicated by means of extendable-retractable measuring tapes as described in my U.S. Pat. No. 4,683,663. Preferably, however, the positions are determined using a computer or microprocessor to which electronic signals are provided by encoding devices 26, 28 and 30 located on the axes for the coordinate measuring machine. As seen in FIGS. 3 and 4, encoder 28 is driven by a toothed wheel 32 that engages a track 34 affixed to arm 16.

As best seen in FIGS. 1 and 5, rail 12 which defines the X axis is horizontally positioned and is provided with a pair of V-shaped convex projecting surfaces 36 and 38. Convex surfaces 36 and 38 are engaged by concave pairs of lower and upper wheels 39, 40 and 41, 42, respectively. These pairs of wheels provide a means for rotatably supporting arm 14 for easy movement along the X axis defined by rail 12. As best seen in FIG. 5, encoder 26 is driven by a toothed wheel 44 that engages a track 46 affixed to rail 12. The encoder 26 transmits electrical signals to microprocessor 24 for the purpose of providing readings indicating the precise position of the coordinate measuring machine along the X axis.

A support housing 50 is mounted for rolling movement upward and downward along the Z axis defined by vertical rail 14. Vertical rail 14 is provided with convex surfaces 52 and 54 on its opposite sides. Both of surfaces 52 and 54 are engaged by concavely surfaced wheels 56, 58 and 60, 62 rotatably mounted on opposite sides of rail 14 to housing 50. Housing 50 can be counter-balanced by means of a weight located with vertical arm 14 in the same manner described in my U.S. Pat. No. 4,683,663, the disclosure of which is incorporated by reference. Housing 50 can, thus, easily be moved up and down vertical arm 14 and will stay in selected position thereon.

Rail 16 is provided with projecting convex surfaces 64, 66 along its upper and lower surfaces. Preferably, the projecting ridges 64 and 66 extend centrally along arm 16. Pairs of concavely surfaced wheels 68, 69 and 70, 71 engage upper and lower convex surfaces 64 and 66, respectively. Conventional mounting device 74 secures pointer 18 to the distal end of arm 16. Mount 74 can either be of the stationary type or of an extendable retractable type driven by a servo-motor, if desired. It is preferred that rails 12, 14 and 16 all be formed of extruded aluminum. The extruded shape can be accurately machined to form the projecting convex surfaces such as 64 and 66. The machine surfaces are preferably anodized in order to provide prolonged wear resistance. While previous horizontal arm designs were accurate only to tolerances of ±0.02 inches it has been found that with the design of this invention, measurements having tolerances of within ±0.001 inch can be achieved.

While the apparatus herein before described is effectively adapted to fulfill the foregoing objects, it is to be understood that the invention is not intended to be limited to the specific preferred embodiments set forth above. Rather, it is to be taken as including all reasonable equivalents to the subject matter of the appended claims.

What is claimed is:

1. A coordinate measuring machine having an aluminum horizontal rail defining an X-axis, a vertical rail movable along said horizontal rail defining a Z-axis, and horizontal arm orthogonally situated relative to said X and Z axes defining a Y-axis wherein, said horizontal arm is movably supported in a support housing supported on said vertical rail for upward and downward movement therein, said arm being movably supported in said housing for extension and retraction along said Y-axis, said arm being of a rectangular cross section with top, bottom, and opposed lateral surfaces, said top and bottom surfaces being provided with first and second convex surfaces V-shaped in cross-section extending upwardly from its upper surface and downwardly from its lower surface, said V-shaped convex surfaces being machined to form accurate planar surfaces and engaging upper and lower concave mating supporting surfaces in said housing.

2. A machine according to claim 1 wherein said concave surfaces comprise upper and lower pairs of wheels that rotatably support said horizontal arm.

3. A machine according to claim 1 wherein said convex surfaces are centrally located along the upper and lower surfaces of said arm.

4. A machine according to claim 1 wherein said vertical rail also has V-shaped convex surfaces along two of its opposed sides and said housing comprises wheels having a mating concave surface each being adapted to roll upwardly and downwardly along said rail.

5. A machine according to claim 4 wherein said housing is counterbalanced by means of a weight located within said vertical rail that travels over a pulley at the top thereof and is attached to said housing.

6. A machine according to claim 1 wherein said horizontal rail is anodized.

7. A machine according to claim 1 for motor vehicle frame measurement for use in realigning the structure of a damaged vehicle wherein a pair of said X axes are provided in parallel orientation adapted to be positioned on opposite sides of a motor vehicle and carry said Y and Z axes, the Z axes being mounted on to extend toward opposite sides of said vehicle.

* * * * *